July 28, 1959   R. L. JOHNSON   2,896,351
PICTURE MOUNT
Filed May 29, 1958
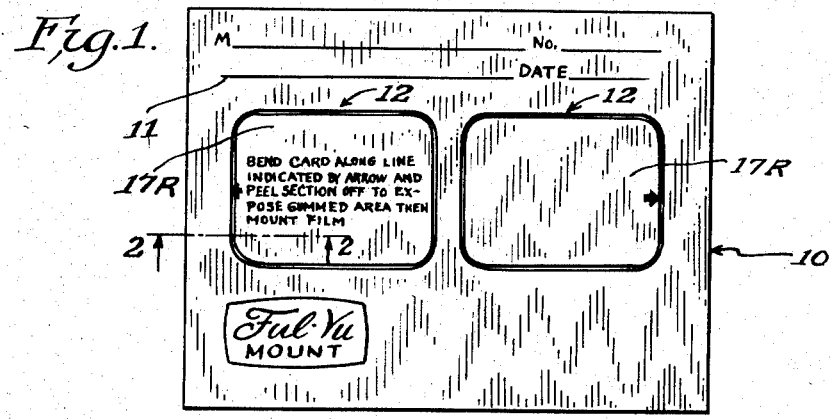
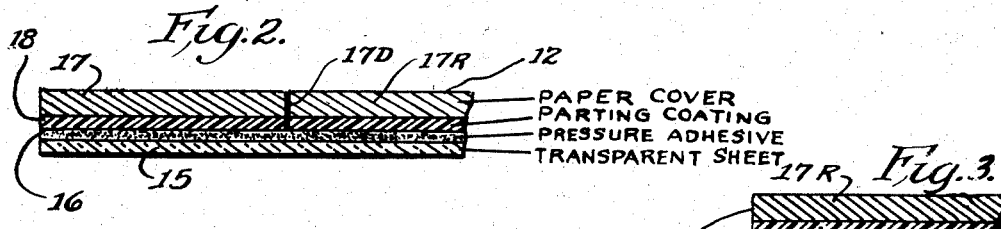
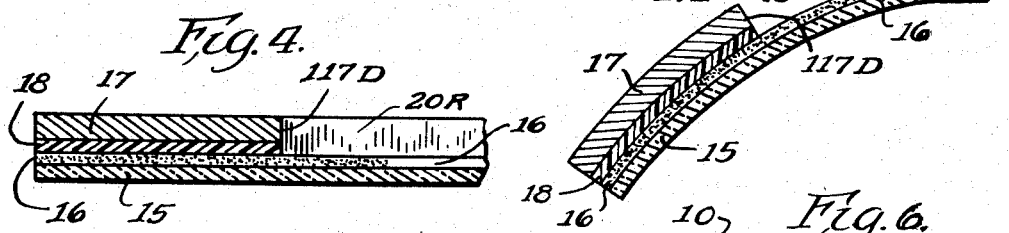
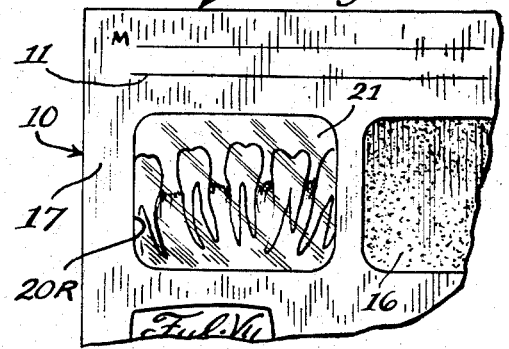
Inventor
Ralph L. Johnson
By Mann, Brown & McWilliams.
Attys.

United States Patent Office 2,896,351
Patented July 28, 1959

2,896,351

PICTURE MOUNT

Ralph L. Johnson, Wheaton, Ill.

Application May 29, 1958, Serial No. 738,888

2 Claims. (Cl. 40—158)

This invention relates to picture mounts and particularly to such mounts that provide a carrier sheet or mounting card upon which one or more pictures may be supported for convenience of handling, viewing and storage.

The sheets or cards that provide such mounts are used for carrying pictures or photographs of different kinds, or types and certain characteristics of the mounts are of course influenced by the kind of photograph or picture which is to be mounted and by the use to which the mounted pictures are to be put. Thus, photographic prints on paper are normally viewed or examined by reflected light so that mounts for such prints may be opaque, while photographic transparencies or films where the picture or image is carried by a transparent sheet must be disposed opposite a transparent portion of the mount so that the image of the film may be viewed by transmitted light.

Furthermore, picture mounts are usually made to receive and support photographs or pictures of a particular size and shape, and supporting means are provided on the mount for holding pictures of the selected size and shape in predetermined positions thereon. Such holding means in the most widely used picture mounts have usually taken the form of pockets formed on or in the mounts to receive each individual picture, although corner-receiving slots have been used in some instances so that the corners of the pictures could be slipped into the slots to mechanically hold the pictures in place.

Such prior picture mounts have been considered to be objectionable either because of cost or difficulty of use, and it is therefore the primary object of this invention to provide a picture mount that is simple and economical in structure and on which pictures may be quickly and easily mounted. Other and related objects are to provide such a picture mount wherein the pictures are held firmly in position on the mount and to provide such a mount that is of uniform thickness throughout its area so that it may be easily handled, stacked and stored.

Another object of the invention is to provide a picture mount that is adapted for use for either photographic prints on paper or photographic transparencies, and a related object is to provide such a mount that is particularly useful as film mount for dental X-ray films and in which the films are supported in such a manner that uniformity of light transmission to the film is assured so as to thus prevent distortion of the viewed image.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawing:

Fig. 1 is a front face view of a picture mount embodying the features of the invention;

Fig. 2 is a fragmentary cross sectional view taken along the line 2—2 of Fig. 1 and showing a portion of the mount at a greatly enlarged scale;

Fig. 3 is a view similar to Fig. 2 and showing the mount in a flexed relation in the course of removal of a separable cover portion in preparation for securing a picture in position on the mount;

Fig. 4 is a view similar to Fig. 2 after the cover portion has been removed in one mounting area;

Fig. 5 is a view similar to Fig. 4 with an X-ray film mounted in the area that was shown as uncovered in Fig. 4; and Fig. 6 is a fragmental face view of the mount with a film in place thereon.

For purposes of disclosure the invention is herein illustrated as embodied in a card-like picture mount 10 that is of a form and design that is specially adapted for mounting dental X-ray films for viewing in the conventional manner, so that as herein shown the picture mount 10 may be more specifically designated as a film mount 10 which provides for mounting of two such dental films of standard size and shape. The film mount 10 is rectangular in shape, and for convenience in filing the same in standard card-filing drawers, the film mount 10 may be made 3" x 4" in size, and in this size an adequate border area is provided about the two film mounting spaces for reception of printed and written data for identifying films that are mounted thereon. Thus, as shown particularly in Figs. 1 and 6, the forward face of the film mount has printed guide lines and text designations 11 across the top thereof where the name of a patient, the name of a referring doctor, an order or film number, and the date may be entered by writing or typing on the forward face of the film mount 10. Somewhat below the printed designations 11, the film mount 10 has two film mounting areas 12 that have the same size and shape as conventional dental X-ray films, and the mounting areas 12 are defined in the present instance by deformation of a portion of the mount, as will be described. On the forward face of the mount 10 and within one of the mounting areas 12, printed text material 13 is provided giving instructions relating to the manipulation and use of the film mount.

The film mount 10 is shown in cross section and at a greatly enlarged scale in Figs. 2 to 5, and the mount comprises a base sheet 15 formed from thin transparent plastic material such as cellulose acetate, and the upper surface of the base sheet 15 is coated with a transparent adhesive 16 which of course represents a relatively thin coating rather than a coating of the exaggerated thickness that has been shown in Figs. 2 to 5. The pressure adhesive coating 16 is fully protected and covered in the film mount 10 by a cover sheet 17 which, in the present instance, is coextensive with the base sheet 15 and is made from a relatively opaque and somewhat flexible paper. The upper face of the cover sheet 17 may be of the usual texture used in printing papers so as to be receptive to ink or other writing or printing materials, while the lower face of the sheet 17 is treated by applying a thin coating 18 of a silicone coating material. The silicone material provides a layer or coating 18 which provides an extremely smooth exposed surface that has a reduced adhesion in respect to the particular pressure-adhesive 16 that is used. The coating 18 that is provided on the lower face of the cover sheet is of such a character as to serve as a parting substance or layer so that while the cover sheet 17 is firmly held in position on the cellulose sheet 15 and cannot be displaced by the ordinary operations of handling and use, it nevertheless is possible to separate the cover sheet 17 or portions thereof from the adhesive 16 by properly applied separating forces, and this is important in the use of the present mount of the present invention, as will be described hereinafter.

It has been pointed out hereinabove that the mounting areas 12 are defined in the present instance by deformation of portions of the film mount, and specifically it is noted that this is accomplished by die-cutting of the cover sheet 17 as at 17D, Fig. 2, to a depth that extends through or substantially through the lower face or coating 18 of the sheet 17. The die-cut 17D defines a removable cover section 17R, which when removed, exposes a window defined by an edge or side 117V of the die-cut 17D. The die-cutting operation is performed after the base sheet 15 and the cover sheet 17 have been assembled so that the adhesive coating 16 is protected and covered at all times during the die cutting operation. The printing of the text 11 and 13 is of course coordinated with the die cutting operation to assure a proper registry or relationship of the mounting areas 12 and the printed text. The die-cut 17D for each mounting area 12 is preferably continuous so that the removable section 17R may be removed with great ease when the mount 10 is to be used, thus to expose the pressure-sensitive coating 16 in the area where a dental film is to be mounted.

Such removal of the section 17R may be readily and easily accomplished by manipulating the mount 10 in the manner illustrated in Fig. 3. Instructions as to such manipulation are preferably included in the printed text material 13. Thus, the main body of the holder is held in one hand, and the edge portion of the card is flexed downwardly as shown in Fig. 3, thus to separate an edge 17E of the removable section 17R from the adhesive 16 and locate this edge 17E in a raised and projecting relation where it may be readily grasped by the user. The user may then strip the removable section 17R away from the opposed portion of the transparent base sheet 16.

When the section 17R has been thus removed, the film mount 10 has a mounting recess 20R that is defined by the edge or side 117D of the die-cut 17D, as indicated in Fig. 4, and the bottom of this recess 20R is formed by an exposed area of the pressure-adhesive 16. Hence, a film 21 that is to be mounted may be put in position in the recess 20R. The film 21, after being accurately located with respect to the recess 20R, is pressed downwardly into the recess so that the lower face of the film 21 engages and becomes adhered to the pressure-sensitive coating 16 that forms the bottom of the recess 20R.

It is to be observed that, as herein shown, the entire body of the mounted film 21 is shown as being located within the mounting recess 20R where it is held in place by and affords a cover or protection for the adhesive 16, but it will be understood that the film may be of a slightly larger size than the recess 20R so that one or more edges of the film will overlap the cover 17. This is possible because the cover 17 is made from paper so that its thickness does not at all interfere with such a mounting, and the exaggerated thickness of the cover 17 and the film 21 as shown in Figs. 2 to 5 should be kept in mind in this regard.

When the picture mount 10 is made in accordance with the present invention, it comprises a flat sheet that is of uniform thickness throughout its area, and the adhesive 16 is protected or covered throughout the entire area of the mount, and hence the mount may be readily handled, stacked or stored. The same advantages are also attained in the mount after a film 21 has been put in place in the mounting or clearance recesses 20R, and the only exception to this is found where a film of a larger size than the opening or recess has been used.

From the foregoing description it will be apparent that the present invention provides an improved picture mount which is extremely simple in its structure and which may be economically manufactured and used. The mounting operations with the picture mount of the present invention may be quickly and easily performed, and when the pictures have been mounted in position, they are firmly held in place and yet are removable if desired.

It will also be apparent that as applied to film mounts, the present invention enables films such as dental X-ray films to be mounted in such a way that they may be viewed without distortion of the image, and the mount that is provided under the present invention produces a structure that may be conveniently used and stored. The front surface of the paper that is utilized in producing the mount serves of course to provide a record area where record information may be readily entered either by writing or typing, and the transparent back sheet provides a smooth back for the mount which facilitates handling and use.

The attached drawings illustrate one form of the invention in which two openings of similar size are provided. The invention may also be utilized with a larger frame area with many openings of the same or different sizes depending on the number and size of films or prints to be mounted.

Thus, while I have illustrated and described a preferred embodiment of my invention it is to be understood that changes and variations may be made by those skilled in the art without departing from the spirit and scope of the appending claims.

I claim:

1. In a mount for photographic transparencies, a transparent flexible base sheet having a transparent coating of pressure-sensitive adhesive on one face thereof, a flexible cover sheet having one face provided with means to provide a low degree of adhesion between said one face and said adhesive, said cover sheet being laminated to said base sheet with said one face of the cover sheet adhered to said adhesive, said cover sheet having at least one separable section defined by a separation line so that the separable section may be removed to expose a mounting area having said pressure-sensitive adhesive retained thereon and exposed for retaining engagement with a photographic transparency of a size corresponding to said separable section.

2. The photograph mount of claim 1 wherein said base sheet is of a transparent plastic material and wherein said cover sheet is opaque.

References Cited in the file of this patent

UNITED STATES PATENTS

| 1,500,025 | Mayer | July 1, 1924 |
| 2,165,250 | George | July 11, 1939 |
| 2,246,984 | Palmer | June 24, 1941 |
| 2,592,262 | Fox | Apr. 8, 1952 |